US012812309B2

(12) United States Patent
Andersen et al.

(10) Patent No.: US 12,812,309 B2
(45) Date of Patent: Nov. 24, 2026

(54) METHOD FOR CHARGING AT LEAST ONE HEARING DEVICE AND A HEARING AID SYSTEM

(71) Applicant: Oticon A/S, Smørum (DK)

(72) Inventors: Ole Andersen, Smørum (DK); Jess Christensen, Smørum (DK); Martin Bergmann, Frederiksberg C (DK); Andreas Robertson, Smørum (DK); Andreas Kofod-Hansen, Smørum (DK)

(73) Assignee: OTICON A/S, Smørum (DK)

( * ) Notice: Subject to any disclaimer, the term of this patent is extended or adjusted under 35 U.S.C. 154(b) by 883 days.

(21) Appl. No.: 17/746,496

(22) Filed: May 17, 2022

(65) Prior Publication Data

US 2022/0377473 A1 Nov. 24, 2022

(30) Foreign Application Priority Data

May 18, 2021 (EP) .................................... 21174353

(51) Int. Cl.
*H04R 25/00* (2006.01)
*H02J 7/82* (2026.01)
*H02J 50/10* (2016.01)

(52) U.S. Cl.
CPC ............ *H04R 25/554* (2013.01); *H02J 7/825* (2026.01); *H02J 50/10* (2016.02); *H04R 25/30* (2013.01); *H04R 2225/31* (2013.01)

(58) Field of Classification Search
CPC .......... H02J 50/12; H02J 50/10; H02J 7/0044; H02J 50/90; H04R 25/554; H04R 25/30; H04R 2225/31
See application file for complete search history.

(56) References Cited

U.S. PATENT DOCUMENTS

2016/0006292 A1* 1/2016 Hatanaka ................ H02J 50/12 320/108
2016/0013658 A1* 1/2016 Kohara ................... H02J 50/12 307/104
2016/0308386 A1 10/2016 Tang et al.
2018/0076667 A1* 3/2018 Pavlovsky .............. B60L 53/12
2018/0102677 A1* 4/2018 Tsai ........................ H02J 50/80
2019/0069067 A1 2/2019 Martin et al.
(Continued)

FOREIGN PATENT DOCUMENTS

EP 1973375 A2 * 9/2008 ........... H04R 25/602
KR 20170107155 A * 9/2017

*Primary Examiner* — Julian D Huffman
*Assistant Examiner* — John P Ondrasik
(74) *Attorney, Agent, or Firm* — Birch, Stewart, Kolasch & Birch, LLP

(57) ABSTRACT

A method for wirelessly charging at least one hearing device (4) via at least one power transmission unit (14) is disclosed. The method comprises: Charging at least one power receiving and storing unit of the at least one hearing device (4) via a wireless charge field of the at least one power transmission unit (14); Turning off the at least one hearing device (4) when the at least one power receiving and storing unit of the at least one hearing device (4) is substantially fully charged; Rebooting the at least one hearing device (4) when the at least one wireless charge field is removed; and Determining the resonance frequency of a coil element of the at least one hearing device (4) after rebooting. Further, a hearing aid system is disclosed.

10 Claims, 2 Drawing Sheets

(56) References Cited

U.S. PATENT DOCUMENTS

| | | | | |
|---|---|---|---|---|
| 2019/0074718 | A1* | 3/2019 | Aliakseyeu | H05B 47/196 |
| 2019/0245387 | A1* | 8/2019 | Park | H02J 7/04 |
| 2019/0246194 | A1 | 8/2019 | Aase et al. | |
| 2019/0268706 | A1* | 8/2019 | Solum | H04R 25/65 |
| 2020/0260176 | A1* | 8/2020 | Baltensperger | H04R 25/55 |
| 2021/0168536 | A1* | 6/2021 | Nielsen | H04R 25/658 |
| 2021/0243532 | A1* | 8/2021 | Backus | H02J 7/00034 |

* cited by examiner

METHOD FOR CHARGING AT LEAST ONE HEARING DEVICE AND A HEARING AID SYSTEM

The present disclosure generally relates to a method for charging at least one hearing device, in particular at least one hearing device to be worn at least partly behind the ear and/or in an ear of a user via at least one power transmission unit. More particularly, the disclosure relates to a method for charging at least one hearing device to be worn at least partly behind the ear of a user via at least one power transmission unit, the method comprising: Charging at least one power receiving and storing unit of the at least one hearing device via a wireless charge field of the at least one power transmission unit; Turning off the at least one hearing device when the at least one power receiving and storing unit of the at least one hearing device is substantially fully charged; Rebooting the at least one hearing device when the at least one wireless charge field is removed; and Determining the resonance frequency of at least one antenna or coil element of the at least one hearing device. Additionally, the present disclosure generally relates to a hearing aid system. More particularly, the disclosure relates to a hearing aid system comprising: a hearing device to be worn at least partly behind the ear of a user, comprising: a housing; and at least one power receiving and storing unit for supplying the at least one hearing device with power; at least one power transmission unit adapted or configured to wirelessly charge the at least one power receiving and storing unit of the at least one hearing device; wherein the hearing aid system is configured to perform the aforementioned method.

Generally, hearing devices to be worn at least partly behind the ear of a user comprise a power receiving and storing unit, for example a battery, in order to supply the hearing devices with power during the usage of the hearing devices. To recharge the power receiving and storing unit, the hearing devices are usually connected to a power transmission unit, for example a charger.

In the state of the art both wireless charging and contact charging of the power receiving and storing units of hearing devices is known.

However, the charging may lead to difficulties in the communication between the hearing device and the power transmission unit, in particular when the hearing device and/or the power transmission unit are powered or turned off.

Nonetheless, it is desirable that the hearing device is turned on when it is removed from the power transmission unit in order to enhance a user's hearing experience. This may be enabled by the hearing device determining whether the wireless or contact charge field of the power transmission unit is turned off and turning on the hearing device if the wireless charge field or contact charge of the power transmission unit is turned off However, if the power transmission unit is shut off, the wireless or the contact charge field of the power transmission unit is usually also so turned off Therefore, the hearing device may be turned on in the power transmission unit resulting in an undesirable draining the power of the power receiving and storing unit.

Therefore, there is a need to provide a solution that allows for an improved charging of a hearing device to be worn at least partly behind an ear of a user. Further to that, there is a need to provide a solution that is able to distinguish whether lack of power to the power receiving unit is due to lack of power to the power transmitting unit or if it is due to the power receiving unit being removed from power transmitting unit.

According to a first aspect a method for wirelessly or contacting charging at least one hearing device via at least one power transmission unit is provided, wherein the method comprises: Charging at least one power receiving and storing unit of the at least one hearing device via a wireless or a contact charge field of the at least one power transmission unit; Turning off the at least one hearing device when the at least one power receiving and storing unit of the at least one hearing device is substantially fully charged; Rebooting the at least one hearing device when the at least one wireless or contact charge field is removed; and Determining the resonance frequency of at least one antenna or coil element of the at least one hearing device after rebooting. By determining the resonance frequency of the at least one antenna or coil element of the at least one hearing device, the hearing device may identify its surrounding after rebooting. This step may be seen as Determining a feature of the surroundings of the hearing device by determining a resonance frequency of at least one antenna or coil element of the at least one hearing device after rebooting. This feature could be used to distinguish between the hearing device being mounted in a charger device or not. Hereby, the hearing device may evaluate whether it is desirable to turn off the hearing device in order to save power, since the resonance frequency of the antenna or coil element when placed inside or in the proximity of a power transmission unit may differ from the resonance frequency of the antenna or coil element when placed substantially free from power transmission unit, i.e. out of a charger device. A charger, or charger device, may comprise two power transmission units each configured to receive and charge a hearing device. This could be achieved by comparing the determined resonance frequency to a threshold or previously determined, and stored, resonance frequency representing either the hearing device being inserted in the power transmission unit or away from the power transmission unit.

According to a second aspect, a hearing aid system is provided, wherein the hearing aid system comprises: a hearing device, comprising: a housing; and at least one power receiving and storing unit for supplying the at least one hearing device with power; at least one power transmission unit adapted or configured to wirelessly or contacting charge the at least one power receiving and storing unit of the at least one hearing device. Preferably, or advantageously, the hearing aid system is configured to perform the aforementioned method. The hearing aid system may comprise the same advantages as aforementioned method. The hearing aid system thus comprises at least one hearing device and a charger device.

According to a third aspect, a computer program (product) is disclosed, wherein the computer program product is capable to perform the method according to the first aspect. The computer program (product) may comprise instructions which, when the program is executed by a computer, cause the computer to carry out (steps of) the method described above, in the description and in the claims.

In an aspect, the functions may be stored on or encoded as one or more instructions or code on a tangible computer-readable medium. The computer-readable medium includes computer storage media adapted or configured to store a computer program comprising program codes, which when run on a processing system causes the data processing system to perform at least some (such as a majority or all) of the steps of the method described above, in the description and in the claims.

In an aspect, a data processing system comprising a processor adapted or configured to execute the computer program for causing the processor to perform at least some (such as a majority or all) of the steps of the method described above, in the description and in the claims.

Preferably, or advantageously, the at least one power transmission unit is a charger, charging station or a charging device. The at least one power transmission unit may comprise a connector for connecting the power transmission unit to a primary charging energy source. The connector may e.g. be plugged into an electrical outlet (e.g. 220 volts AC) from which the power transmission unit may be supplied with charging current. Alternatively, the connector may be a USB connector, whereby the power transmission unit may be supplied with charging current from another electronic device, e.g. a PC, television or other device, such as the electricity supply grid. In one embodiment, the connector comprises a connector suitable for a plurality of mobile phone chargers, or other common mobile chargers. This enables different possible charging options for the power transmission unit.

The hearing device may be adapted or configured for being located at or in an ear of a user, or for being partially implanted in the head of a user.

The at least one power transmission unit may also comprise a separate battery so that the at least one hearing device may be charged by the power transmission unit also when the power transmission unit is not connected to a primary energy source, such as a mains supply.

Preferably, or advantageously, the at least one power transmission unit comprises at least one coil, in particular an inductive coil, in order to wirelessly, preferably, or advantageously, inductively, charge the at least one hearing device. The coil may be configured to generate varying magnetic field and thus charge the power receiving and storing unit, in particular the battery, of the at least one hearing device. It is preferred that the power receiving and storing unit of the at least one hearing device comprises a corresponding coil. Hereby, the power transmission unit may generate an electrical current in the coil of the hearing device and thereby charge the power receiving and storing unit of the hearing device.

Preferably, or advantageously, the at least one power transmission unit comprises a first group of contacts to contacting charge the at least one hearing device. The first group of contacts may be configured to generate varying charge field and thus charge the power receiving and storing unit, in particular the battery, of the at least one hearing device. It is preferred that the power receiving and storing unit of the at least one hearing device comprises a second group of contacts configured to be connected to the first group of contacts. Hereby, the power transmission unit may generate and transmit an electrical current through the first group of contacts to the second group of contacts, and thereby charge the power receiving and storing unit of the hearing device.

The antenna or coil element may form a resonant structure. The antenna or coil element may be an inductive antenna, a near-link coil, a near-link antenna or a Bluetooth antenna or the like. The resonance frequency of the antenna or coil preferably, or advantageously is in the range of 3 MHz to 10 GHz, such as in the ISM band, such as around 3.8 MHz, such as around 2.4 GHz, such as around 5 GHz. This may be advantageous when dealing with the near-link or the Bluetooth communication protocol. Designing the antenna or coil element for other suitable frequencies or frequency intervals is also possible.

In one embodiment the at least one power transmission unit may be a behind-the-ear charging device configured to be attached behind the ear, wherein the charging device comprises a battery. This allows for providing wireless charging while the hearing device may still be positioned in the ear canal. Accordingly, it is possible to leave the hearing aid device in the ear canal for longer time periods since removal of the hearing aid device is not required.

It may further be determined whether the at least one hearing device is located in the proximity of the at least one power transmission unit depending on the determined resonance frequency of the at least one antenna or coil element of the at least one hearing device. This is caused by the resonant frequency of the antenna or coil element when placed inside or in the proximity of a power transmission unit may differ from the resonant frequency of the antenna or coil element when placed substantially free from objects or near a head of a user. Proximity in this context in particular relates to a location of the hearing device in which the hearing device would be sufficiently charged by the at least one power transmission unit via the wireless charge field. This enables the hearing device to perform specific actions depending on its position with regard to the power transmission unit.

At least one of at least two different operating modes of the at least one hearing device depending on the resonance frequency of the at least one antenna or coil element may be set. One of the at least two different operating modes of the at least one hearing device may be a normal operating mode of the at least one hearing device. One of the at least two different operating modes of the at least one hearing device may be a power off mode, a low power mode (a sleep mode or a standby mode) of the at least one hearing device. Hereby, the hearing device may be set into one of the at least two different operating modes depending on the position of the hearing device and/or the time on the day of the measured position. If the hearing device for example still is in or in the proximity of the at least one power transmission unit, the hearing device may be set in a power off mode or a low power mode in order to not undesirably drain the charged power receiving and storing unit of the hearing device. The low power mode makes it possible for the hearing device to turn automatically into the normal operating mode when the user removes the hearing device away from the at least one power transmission unit. If the hearing device for example is not in the proximity or in the at least one power transmission unit, the hearing device may be set in a normal operating mode in order to enhance the hearing experience of a user. The normal operating mode may for example be the operating mode of the hearing device a user typically uses.

The at least one power transmission unit may comprise a housing and an openable and closable lid and the at least one hearing device may be set into one of the at least two different operating modes depending on whether the lid is opened or closed. Preferably, or advantageously, the at least one power transmission unit may also comprise a sensor in order to detect whether the lid is opened or closed. This allows to also take into account the state of the lid of the power transmission unit when setting the at least one hearing device into one of the at least two operating modes. If the charger/power transmission unit comprises a battery, the detection of the lid being closed may be used to determine of the charger device/power transmission unit should enter a low power mode, e.g. when no hearing device is present and the lid is closed.

The at least one power transmission unit may comprise a housing and an openable and closable lid and the at least one power transmission unit may be set into at least one of at least two different operating modes depending on whether the lid is opened or closed. Preferably, or advantageously, the at least one power transmission unit may also comprise a sensor in order to detect whether the lid is opened or closed. Such a sensor may advantageously be, or include, a Hall sensor. This allows to also take into account the state of the lid of the power transmission unit when setting the at least power transmission unit into one of the at least two different operating modes.

A power transmission unit according to the present disclosure may comprise a weight placed in a housing of the power transmission unit or charger device so as to provide stability to the power transmission unit. By adding a weight, or counter weight, the power transmission unit is more stable when the user place one or more hearing device to be charged in the power transmission unit/charger device. As mentioned herein, the power transmission unit or charger device may comprise a battery, and such a battery may act as a weight which adds stability to the power transmission unit/charger device.

Preferably, or advantageously, one of the at least two different operating modes of the at least one power transmission unit is a power off mode of the at least one power transmission unit and one of the at least two different operating modes of the at least one power transmission unit is a normal operating mode of the at least one power transmission unit. This may further enhances the usability of the at least one power transmission unit since the power transmission unit for example may turn into normal operating mode when the lid is opened. The normal operating mode of the at least one power transmission unit may for example be the operating mode which is usually used to charge the power receiving and storing unit of the at least one hearing device.

The at least one hearing device may be turned on from a power off mode by pushing a button of the at least one hearing device and/or the at least one hearing device may be turned on from a power off mode by inserting the at least one hearing device into the at least one power transmission unit. Preferably, or advantageously, the hearing device is only turned on when being inserted into the power transmission unit if the power transmission unit is turned on. This allows a reliable charging of the at least one hearing device, in particular if the at least one power transmission unit does not comprise a lid.

The at least one hearing device may be configured to determine a resonance frequency of the at least one antenna or coil element of the at least one hearing device when the at least one hearing device is removed from the at least one power transmission unit and/or when the at least one power receiving and storing unit of the at least one hearing device is fully charged and/or when the at least one power transmission unit is in a power off mode. Hereby, the hearing device may determine whether the hearing device is still in the proximity of the power transmission unit or rather is being used to enhance the hearing experience of a user in a beneficial way.

The at least one hearing device may be configured to signal the power transmitting unit when it is fully charged.

The at least one power receiving and storing unit of the at least one hearing device may be charged via at least one inductive coil of the at least one power transmission unit; wherein the at least one inductive coil of the at least one power transmission unit is calibrated by pulse width modulating the voltage supplied by the at least one inductive coil of the at least one power transmission unit. By pulse width modulating the voltage supplied to the at least one inductive coil, an increased efficiency and low power consumption may be provided. Preferably, or advantageously, the at least one inductive coil of the at least one power transmission unit is calibrated by pulse width modulating frequencies supplied by the at least one inductive coil of the at least one power transmission unit. Preferably, or advantageously, fixed carrier frequencies of the voltage supplied by the at least one inductive coil of the at least one power transmission unit may be selected. The power supplied via the at least one coil of the at least one power transmission unit may be regulated based on the coil voltage feedback. The calibration of the at least one inductive coil may be processed by a microcontroller. The microcontroller may comprise a pulse width modulation output and an analogue to digital converter.

The at least one power receiving and storing unit of the at least one hearing device may be charged via at least one inductive coil of the at least one power transmission unit; wherein the at least one inductive coil of the at least one power transmission unit is calibrated by controlling the voltage supplied by the at least one inductive coil of the at least one power transmission unit via a voltage controlled oscillator. This allows the voltage supplied via the at least one inductive coil of the at least one power transmission unit to be precisely tuned. Preferably, or advantageously, the at least one inductive coil of the at least one power transmission unit is calibrated by controlling frequencies supplied by the at least one inductive coil of the at least one power transmission unit via a voltage controlled oscillator. The calibration of the at least one inductive coil, in particular the voltage or frequency supplied by the at least one inductive coil of the power transmission unit may be carried out by a microcontroller. The microcontroller may comprise a digital to analogue converter and an analogue to digital converter. Further, the power transmission unit may comprise a voltage control oscillator comprising an oscillating core. The frequency of the voltage control oscillator and the power level of the at least one inductive coil of the at least one power transmission unit may be regulated based on the coil voltage feedback.

The at least one power receiving and storing unit of the at least one hearing device may be charged via at least one inductive coil of the at least one power transmission unit, wherein the at least one inductive coil of the at least one power transmission unit may be calibrated by controlling the voltage supplied by the at least one inductive coil of the at least one power transmission unit via a self-resonant circuit. Preferably, or advantageously, the at least one inductive coil of the at least one power transmission unit is calibrated by controlling the frequencies supplied by the at least one inductive coil of the at least one power transmission unit via a self-resonant circuit. Preferably, or advantageously, the self-resonant circuit comprises a phase-lag feedback loop, wherein the feedback loop may provide a sufficient phase lag to enable self-resonance.

The at least one power transmission unit may comprise a housing and an openable and closable lid, wherein the at least one inductive coil of the at least one power transmission unit may be calibrated when the lid of the power transmission unit is closed or when the lid of the power transmission unit is closed and a button of the power transmission unit is pressed. Hereby, the power transmission unit may calibrate when a hearing device is arranged inside the power transmission unit. Thus, the charging of the power transmission unit may be adapted or configured depending on the hearing device arranged inside the housing of the power transmission unit. The button of the power transmission unit preferably, or advantageously, is arranged on the outside of the housing or the lid and preferable is connected to a microcontroller of the power transmission unit.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
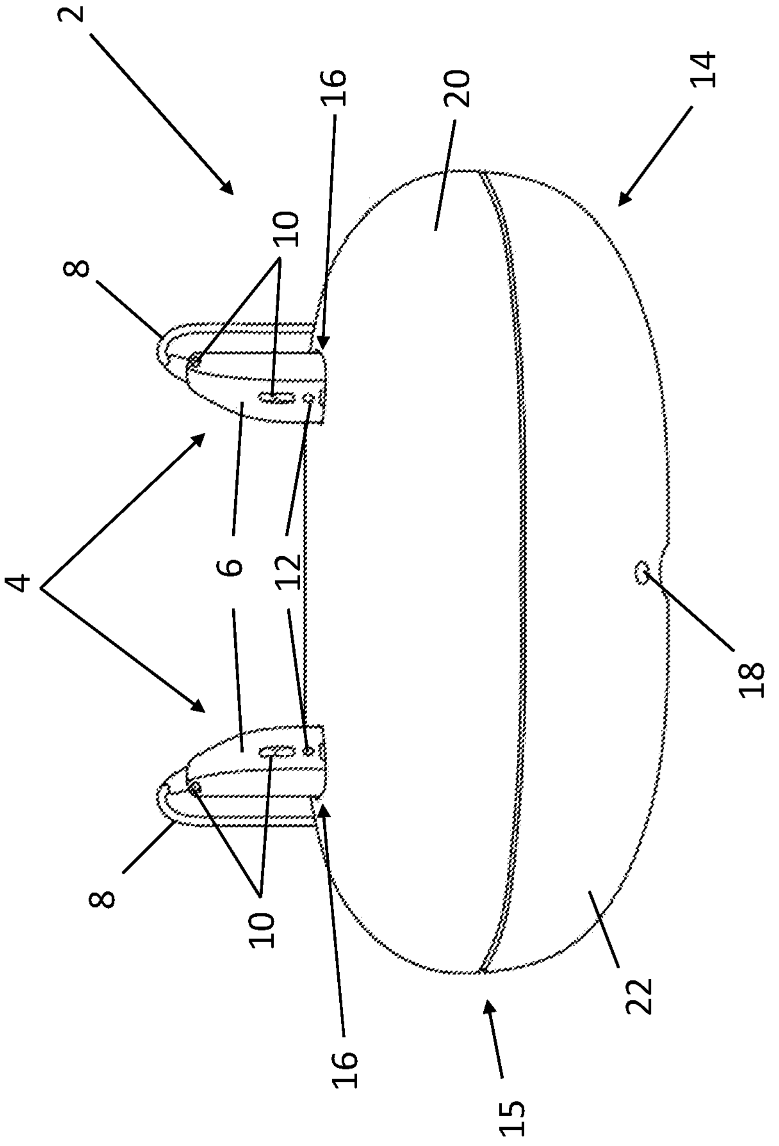
FIG. 1 schematically shows a first embodiment of a hearing aid system in a perspective view.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device (or hearing instrument, hearing assistance device) may be or include a hearing aid that is adapted or configured to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. The "hearing device" may further refer to a device such as a hearable, an earphone or a headset adapted or configured to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

The hearing device is adapted or configured to be worn in any known way. This may include i) arranging a unit of the hearing device behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in a Bone Anchored Hearing Aid or a Cochlear Implant, or iv) arranging a unit of the hearing device as an entirely or partly implanted unit such as in a Bone Anchored Hearing Aid or a Cochlear Implant. The hearing device may be implemented in one single unit (housing) or in a number of units individually connected to each other.

Two or more hearing devices may be connected to a system of hearing devices, and a "binaural system of hearing devices" refers to a system comprising two hearing devices where the devices are adapted or configured to cooperatively provide audible signals to both of the user's ears. These systems may further include one or more auxiliary device that communicates with at least one hearing device, the auxiliary device affecting the operation of the hearing devices and/or benefitting from the functioning of the hearing devices. A wired or wireless communication link between the at least one hearing device and the auxiliary device may be established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted or configured to receive a multitude of audio signals such as from an entertainment device like a TV or a music player, a telephone apparatus like a mobile telephone or a computer, e.g. a PC. The auxiliary device may further be adapted or configured to (e.g. allow a user to) select and/or combine an appropriate one of the received audio signals (or combination of signals) for transmission to the at least one hearing device. The remote control is adapted or configured to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted or configured to (relatively) enhance a target acoustic source among a multitude of acoustic sources in the user's environment and/or to attenuate other sources (e.g. noise). In one aspect, the directional system is adapted or configured to detect (such as adaptively detect) from which direction a particular part of the microphone signal originates. This may be achieved by using conventionally known methods. The signal processing unit may include an amplifier that is adapted or configured to apply a frequency dependent gain to the input audio signal. The signal processing unit may further be adapted or configured to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

Now referring to FIG. 1, which schematically shows a first embodiment of a hearing aid system 2 in a perspective view.

The hearing aid system 2 comprises two hearing devices 4, wherein the hearing devices 4 are configured as behind the ear hearing devices 4. Therefore, the hearing devices 4 comprise a housing 6 to be arranged behind the ear of a user, wherein the housing is connected via a cable 8 to a speaker (not shown) which may be arranged inside the ear of the user. The housing 6 comprises at least one power receiving and storing unit which is preferably, or advantageously, formed as a battery. Further, the housing 6 comprises two microphones 10 to provide direction dependent audio signal processing. The microphones 10 may enhance a target acoustic source and/or attenuate other undesirable acoustic sources. The housing 6 of the hearing device 4 may comprise a Status LED 12 which for example may indicate the charging status of the battery.

The hearing aid system 2 comprises one power transmission unit 14 which is adapted or configured to wirelessly or contacting charge the two hearing devices 4. The power transmission unit 14 is preferably, or advantageously, configured as a charger 14 with a housing 15. The charger 14 comprises two recesses 16 in which, respectively, the two hearing devices 4 may be placed in order to ensure a preferable charging position of the hearing devices 4 and the charger 14. The charger 14 may further comprise a Status LED 18 which may for example indicate the power level of the charger 14 if the charger 14 comprises a battery and/or charge information relating to the hearing device(s). The housing 15 of the charger 14 may comprise a top part 20 and a bottom part 22 which are detachable from each other. Hereby, the charger 14 may for example be demounted in order to repair the charger 14 or to replace a battery of the charger 14.

Preferably, or advantageously, the charger 14 comprises inductive coils which are corresponding to inductive coils of the hearing devices 4 in order to wirelessly and inductively charge the batteries of the hearing devices 4.

Figure 2:
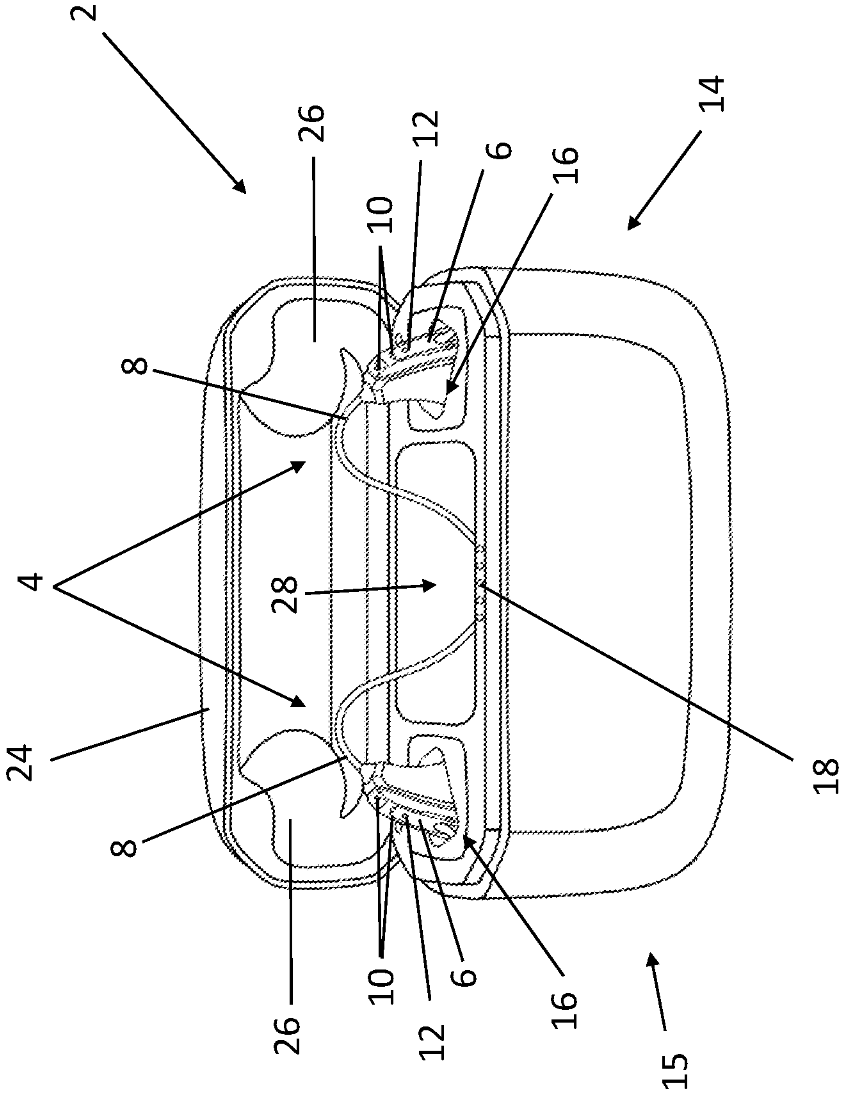
FIG. 2 schematically shows a second embodiment of a hearing aid system in a perspective view.

FIG. 2 schematically shows a second embodiment of a hearing aid system 2 in a perspective view. Differing from the first embodiment depicted in FIG. 1, the charger 14 comprises a housing 15 and an openable and closable lid 24. The lid 24 comprises two openings 26 which are configured to surround the two hearing devices 4 when the lid 24 is closed. Further the charger 14 comprises a sensor (not shown) which is able to detect whether the lid 24 is closed or opened. The sensor could be a Hall sensor. Hereby, the charger 14 and/or the hearing devices 4 may be set into an operating mode, depending on the opening status of the lid 24, such as a charging state. Further, the charger 14 comprises a plurality of status LEDs 18 and a cavity 18 to store the speakers of the two hearing devices 4. The LEDs 18 may be configured to indicate the state of an internal battery of the charger device. This could include lighting difference colors of the different LEDs, e.g. green for the first two LEDs and an orange light in a third LED to indicate a discharge level. One or more of the LEDs may be pulsed, such as relatively slowly pulsed, in order to indicate that the charger is currently charging one or more hearing devices. As the charger device may communicate with the hearing device or devices being charged, it is possible to output visible feedback via one or more of the LEDs to the user based on that communication. This could be to indicate that charging is done, is nearly done, such as 80% done or the like. Such indication could be achieved via one or more LEDS distinct from one or more LEDs indicating a battery level of a battery internal to the charger.

The charger 14 comprises an opening or space 28 into which the cable and speaker/output transducer/in-the-ear housing 8 may be placed during charging/storing. The charger may include an auditory output transducer to communicate information to the user, such as a sound, beep or more complex sounds, when charging is commenced and/or finished. Additionally, haptic feedback to the user may be given, e.g. when a hearing device is correctly inserted and/or when charging is commenced.

Communication between the charger/power transmission unit and the hearing device may be established via contacts also used for contact charging and/or via wireless connection between the charger/power transmission unit and the hearing device. Such a connection may be used for the charger to obtain information on the charge level of the hearing device, such that the charger is able to determine if charging should be stopped or slowed down, e.g. by lowering charge level. Communication may be achieved via load communication or other means. Communication signals may be modulated using Amplitude Shift Keying, Frequency Shift Keying, Phase Shift Keying, Binary Frequency Shift Keying and/or variants hereof. The communication may be encoded using a proprietary protocol or a standardized protocol.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A method for contact charging a hearing device via a power transmission unit in a charger, wherein the hearing device comprises, a power receiving and storing unit comprising one or more contacts configured to perform the contact charging of the power receiving and storing unit, an input unit including at least one microphone configured to receive an acoustic signal and provide a corresponding input audio signal, a coil element configured for performing wireless communication with an external device, a signal processor configured to process the input audio signal, an output unit including a loudspeaker configured to output the processed audio signal, and a hearing device processor configured to regulate the input unit, the signal processor and the output unit, the method comprising:

charging the power receiving and storing unit of hearing device via the one or more contacts of the power receiving and storing unit;

turning off the input unit, the signal processor, and the output unit of the hearing device, while maintaining the hearing device processor in an active state, when the power receiving and storing unit of the hearing device is charged above a threshold;

in response to the contact charge field being removed after the turning off step, executing a reboot of the hearing device by the hearing device processor during which the hearing device processor powers down and restarts, the hearing device processor being programmed to determine a resonance frequency of the coil element of the hearing device upon restarting; and selectively powering up the rebooted hearing device by determining, based on the determined resonance frequency of the coil element, by the hearing device processor whether the rebooted hearing device is still located in contact with the charger, powering up the hearing device in response to the hearing device processor determining that the rebooted hearing device is not in contact with the charger, and not powering up the hearing device in response to the hearing device processor determining that the rebooted hearing device is still in contact with the charger, wherein the hearing device processor executes a reboot and determines the resonance frequency of the coil element of the hearing device in response to the power receiving and storing unit of the hearing device being fully charged, and/or the power transmission unit being in a power off mode.

2. Method according to claim 1, where the step of determining whether the rebooted hearing device is located in contact with the charger further comprises comparing the determined resonance frequency to a threshold or a stored resonance frequency.

3. Method according to claim 1, the method further comprising: setting by the hearing device processor at least one of at least two different operating modes of the hearing device depending on the determined resonance frequency of the coil element.

4. Method according to claim 3, wherein one of the at least two different operating modes of the hearing device is a normal operating mode of the hearing device.

5. Method according to claim 4, wherein one of the at least two different operating modes of the hearing device is a power off mode and/or a low power mode of the hearing device.

6. Method according to claim 3, wherein one of the at least two different operating modes of the hearing device is a power off mode and/or a low power mode of the hearing device.

7. Method according to claim 1, wherein the power transmission unit comprises a housing and an openable and closable lid, and wherein the power transmission unit is set into one of at least two different operating modes depending on whether the lid is opened or closed.

8. Method according to claim 7, wherein one of the at least two different operating modes of the power transmission unit is a power off mode of the power transmission unit and one of the at least two different operating modes of power transmission unit is a normal operating mode of the power transmission unit.

9. Method according to claim 1, the method further comprising:

turning on the hearing device from a power off mode by pushing a button of the hearing device; and/or turning on the hearing device from a power off mode by inserting the hearing device into the charger.

10. A hearing aid system comprising:

a hearing device and at least one charger including a power transmission unit, wherein the hearing device includes:

a housing;

a power receiving and storing unit for supplying the hearing device with power, said power receiving and storing unit including one or more contacts configured to perform contact charging of the power receiving and storing unit;

an input unit including at least one microphone configured to receive an acoustic signal and provide a corresponding input audio signal;

a coil element configured for performing wireless communication with an external device;

a signal processor configured to process the input audio signal, an output unit including a loudspeaker configured to output the processed audio signal; and a hearing device processor configured to regulate the input unit, the signal processor, and the output unit, wherein the power transmission unit includes one or more contacts and is configured to contact charge the power receiving and storing unit of the hearing device via connections between the one or more contacts of the power transmission unit and the one or more contacts of the power receiving and storing unit of the hearing device;

wherein the hearing device processor is programmed to perform an operation of turning off the input unit, the signal processor, and the output unit of hearing device, while maintaining the hearing device processor in an active state, when the power receiving and storing unit of the hearing device is charged above a threshold;

in response to the contact charge field being removed after the turning off operation, execute a reboot of the hearing device during which the hearing device processor powers down and restarts, and determine a resonance frequency of the coil element of the hearing device upon restarting; and selectively power up the rebooted hearing device by determining, based on the determined resonance frequency of the coil element, whether the rebooted hearing device is located in contact with the charger, powering up the hearing device in response to the hearing device processor determining that the rebooted hearing device is not in contact with the charger, and not powering up the hearing device in response to the hearing device processor determining that the rebooted hearing device is still located in contact with the charger;

wherein the hearing device processor executes a reboot and determines the resonance frequency of the coil element of the hearing device in response to the power receiving and storing unit of the hearing device being fully charged, and/or the power transmission unit being in a power off mode.

* * * * *